J. MUCHKA.
TESTING DEVICE.
APPLICATION FILED MAY 28, 1908.

961,419.

Patented June 14, 1910.

Witnesses:

Inventor
Josef Muchka
by his Attorney

UNITED STATES PATENT OFFICE.

JOSEF MUCHKA, OF VIENNA, AUSTRIA-HUNGARY.

TESTING DEVICE.

961,419.

Specification of Letters Patent. Patented June 14, 1910.

Application filed May 28, 1908. Serial No. 435,578.

*To all whom it may concern:*

Be it known that I, JOSEF MUCHKA, a citizen of Austria, and residing at Vienna, in the Province of Lower Austria, Empire of Austria-Hungary, have invented certain new and useful Improvements in Testing Devices, of which the following is a full, clear, and exact specification.

This invention relates to an improved apparatus for testing the efficiency of steam separators and the like.

The apparatus comprises a condensation cylinder of transparent material fitted with a color scale and connected to the exhaust pipe leading from the separator by means of an intercepting tube, so that part of the vapor flowing from the separator will be caused to condense in the cylinder, and the degree of milky opaqueness of the condensate determined with the aid of the scale.

The apparatus also comprises certain details of construction hereinafter more particularly described.

Figure 1:
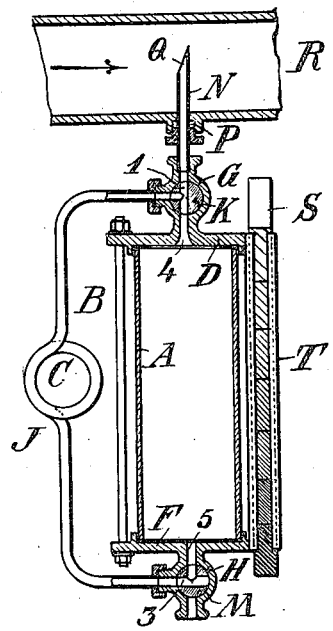
Figure 2:
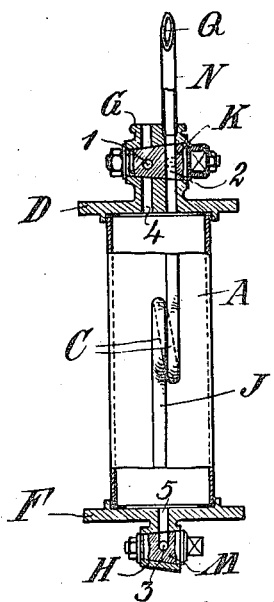
Figure 3:
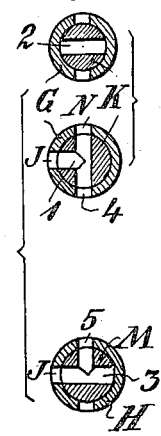
Figure 4:
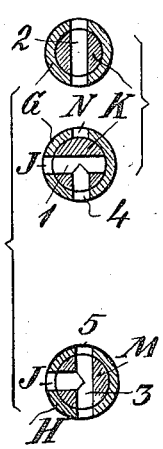
Figure 5:
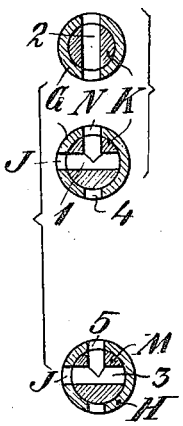

In the annexed drawings which illustrate the invention Figures 1 and 2 show the apparatus in section in two planes, at right angles to each other, while Figs. 3, 4 and 5 illustrate diagrammatically the different positions of details of the apparatus which they may assume during use.

The improved apparatus consists, as shown at Figs. 1 and 2, of a glass cylinder A, which is packed between two cover plates D and F by means of the bolts B and suitable packing. These cover plates carry cock casings G, H, the casings being connected by a tube J; this tube J is preferably flexible with a helical coil C in order that the cylinder A may be removed without detaching the connection between the cock casings. The cock K of the casing G mounted on the upper cover D has a three-way passage 1 and a through-way passage 2, while the cock M of the lower casing has only a three-way passage 3. Also connected to the upper casing is the tube N which by means of the bush P is tightly fitted in the steam exhaust pipe R coming from the separator. The end of the tube N extending into the pipe R is cut off at an inclination and the opening Q of the same is directed toward the issuing steam so that when the cocks K and M are in the right position vapor can pass into the glass cylinder A partly through the opening 4 in the upper cover and partly through the connecting tube J and the opening 5 on the lower cover.

When the apparatus is to be operated for the purpose of making a test, the cocks K and M are set into the positions shown in Fig. 3 so that the steam caught by the tube N can pass into the glass cylinder and condense therein. From the color of the condensate which is clearer the less emulsified oil it contains the contents of emulsified oil can be approximately estimated with the aid of a color scale. As the test can be made with greater certainty with light passing through than with light falling on the liquid, it is preferable to make the scale of transparent glass and to fit the same in the form of a glass strip S arranged in a frame T alongside the cylinder A. When the test has been completed the condensate collected in the cylinder can be run off or returned into the exhaust pipe R. For the former case the cocks K and M are brought into the positions shown in Fig. 4 in which the tube N is cut off from the cylinder A and the tube J, but the interior of the cylinder is connected at top and bottom with the atmosphere so that the condensate can flow off through the bottom opening 5. For the purpose of returning the condensate to the exhaust pipe R the cocks are brought into the positions shown in Fig. 5. In this case the interior of the cylinder is connected on top with the atmosphere by the passage 2, and at bottom communicates with the tube J through the passage 4, which in turn is connected with the tube N through the three-way passage 1. As now air can enter the interior of the cylinder the vapor passing over the mouth of the tube N can exert a suction effect in the tubes N and J, the condensate is sucked back out of the cylinder A into the pipe R. In order to increase the suction effect in this case, the tube N can be shifted around 90°.

With slight experience, by means of the scale, the contents of oil in the condensate can be estimated with approximate accuracy, and it is thus possible not only to demonstrate or test the efficiency of a separator visually.

I claim:

1. In an apparatus of the character described the combination with the exhaust pipe of a separator, of a condensation cylinder of transparent material, an intercepting tube connecting the said cylinder and exhaust pipe, and a color scale for estimating the proportion of oil present substantially as described.

2. In an apparatus of the character described the combination with the exhaust pipe of a separator, of a condensation cylinder of transparent material, an intercepting tube connecting the said cylinder and exhaust pipe, and a color scale for estimating the proportion of oil present, said color scale being of transparent glass and fitted alongside the condensation cylinder.

3. In an apparatus of the character described, the combination with the exhaust pipe of a separator, of a condensation cylinder of transparent material, cover plates between which said cylinder is secured, each of said plates carrying a cock-casing, an intercepting tube connecting said cylinder and exhaust pipe, a tube connecting said cock-casings, cocks arranged within said casings, and adapted to connect the interior of the cylinder with the intercepting tube alone or with the atmosphere alone or with the intercepting tube and also the atmosphere, all as described.

In testimony whereof I have signed my name to this specification in the presence of two subscribing witnesses.

JOSEF MUCHKA.

Witnesses:
 WILHELM BOYD,
 ROBERT W. HEINGARTNER.